(No Model.) 11 Sheets—Sheet 1.

W. J. FRAZIER.
ROTARY ENGINE.

No. 276,235. Patented Apr. 24, 1883.

Fig. 1.

WITNESSES:

INVENTOR

BY P. Van Antwerp.
his ATTORNEY (No Model.)

W. J. FRAZIER.
ROTARY ENGINE.

No. 276,235. Patented Apr. 24, 1883.

WITNESSES:
John F. Moore
Frank O. Bennet

W. J. Frazier INVENTOR

BY

ATTORNEY (No Model.)

W. J. FRAZIER.
ROTARY ENGINE.

No. 276,235.   Patented Apr. 24, 1883.

Fig. 4.

WITNESSES:
Frank A. Bennett
John W. Moore

INVENTOR
W. J. Frazier

BY P. Van Antwerp
his ATTORNEY (No Model.)

W. J. FRAZIER.
ROTARY ENGINE.

No. 276,235. Patented Apr. 24, 1883.

Fig. 6.

WITNESSES:
Frank O. Bennet
John D. Moore

W. J. Frazier
INVENTOR

BY P. Van Antwerp
his ATTORNEY (No Model.)                    W. J. FRAZIER.                 11 Sheets—Sheet 8.
ROTARY ENGINE.

No. 276,235.                               Patented Apr. 24, 1883.

WITNESSES:                                 W. J. Frazier INVENTOR

BY

ATTORNEY (No Model.) 11 Sheets—Sheet 9.
W. J. FRAZIER.
ROTARY ENGINE.

No. 276,235. Patented Apr. 24, 1883.

(No Model.) 11 Sheets—Sheet 10.

W. J. FRAZIER.
ROTARY ENGINE.

No. 276,235. Patented Apr. 24, 1883.

WITNESSES:
John F. Moore
Frank O. Browne

W. J. Frazier INVENTOR

BY

ATTORNEY

(No Model.)

W. J. FRAZIER.
ROTARY ENGINE.

No. 276,235. Patented Apr. 24, 1883.

WITNESSES:

W. J. Frazier INVENTOR

BY

ATTORNEY

UNITED STATES PATENT OFFICE.

WILLIAM J. FRAZIER, OF NEW YORK, N. Y.

ROTARY ENGINE.

SPECIFICATION forming part of Letters Patent No. 276,235, dated April 24, 1883.

Application filed September 28, 1882. (No model.)

*To all whom it may concern:*

Be it known that I, WILLIAM J. FRAZIER, of the city and State of New York, have invented certain new and useful Improvements in Rotary Engines; and I do hereby declare that the following is a full, clear, and exact description of the same, reference being had to the accompanying drawings, forming part of this specification, in which—

Figs. 25, 26, 27, outside, side, and inside views of end packing-piece; Figs. 28, 29, edge and section of outer packing, (see Fig. 18;) Figs. 30, 31, edge and section of inner packing, (see Fig. 18;) Figs. 32, 33, top view and section of intermediate packing-pieces.

Similar letters refer to corresponding parts in the various drawings.

My invention relates to that class of rotary engines which employs a revolving piston carrying radial slides or piston-wings, and, together with the driving-shaft, to which it is secured, occupies an eccentric position relative to the engine-cylinders, and in which engine the steam is used first at a high pressure on a short piston leverage within the cylinders forming part of the piston, and afterward expansively at a lower pressure on a longer leverage within the outer cylinder of the engine; and it consists, first, in the novel devices for operating the slide-valves $A'\ A^2$; second, in the construction and use of steam-passages, whereby the steam from the high-pressure cylinders is so transmitted and conveyed to a section of the outer or low-pressure cylinder, and therein so applied, that the expanding steam will exert its pressure on the outer extremities of the wings of the piston during their travel over that section of the interior surface of the outer cylinder which forms the widest portion of the crescent, and in which the said piston-wings are projected to their relatively greatest limit from the exterior or periphery of the piston; third, in the construction, arrangement, and use of the valves, steam-ports, and steam-passages, whereby, through the manipulation of the said valves of the engine, said engine may be operated and said piston rotated in either direction, the steam acting at high pressure in the inner cylinder and also expansively in the outer cylinder in either case; fourth, in the construction and use of the wings of a revolving piston carrying intermediate self-adjusting packing-pieces, which packing-pieces and the said wings carry oscillating self-adjusting packings, and also providing said wings with self-adjusting end packings; fifth, in providing said piston with self-adjusting packings, self-adjusting segmental rim-packings, and self-adjusting packings at either side of the hub of the piston.

Figure 1:
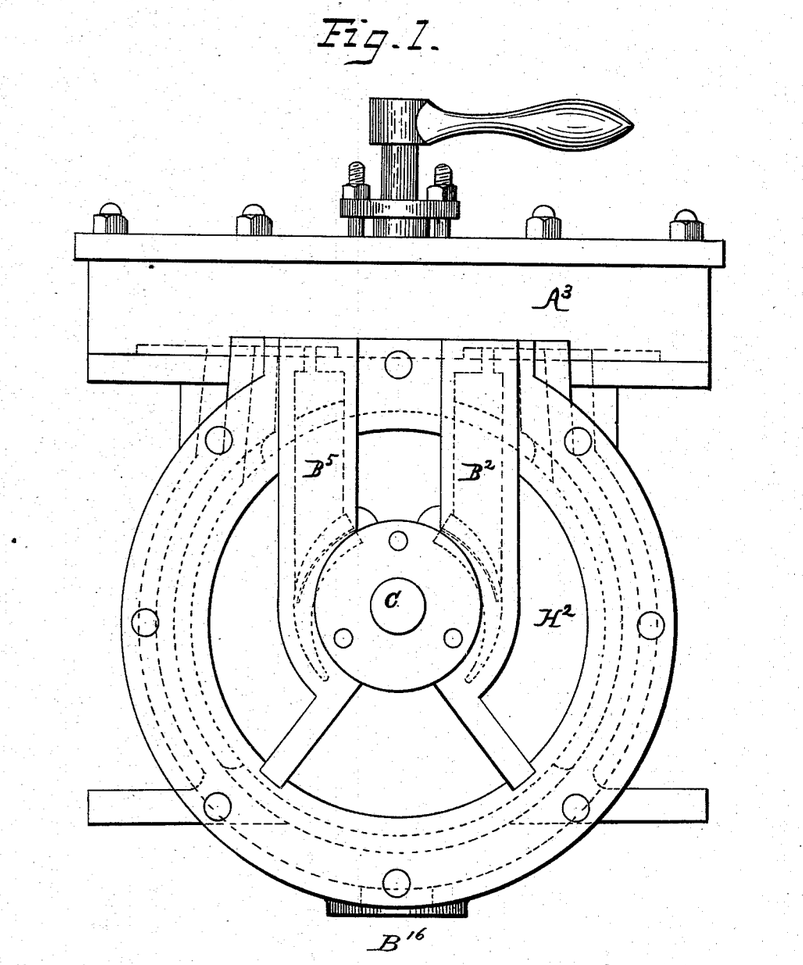
Figure 1 is an end elevation of the engine.
Figure 2:
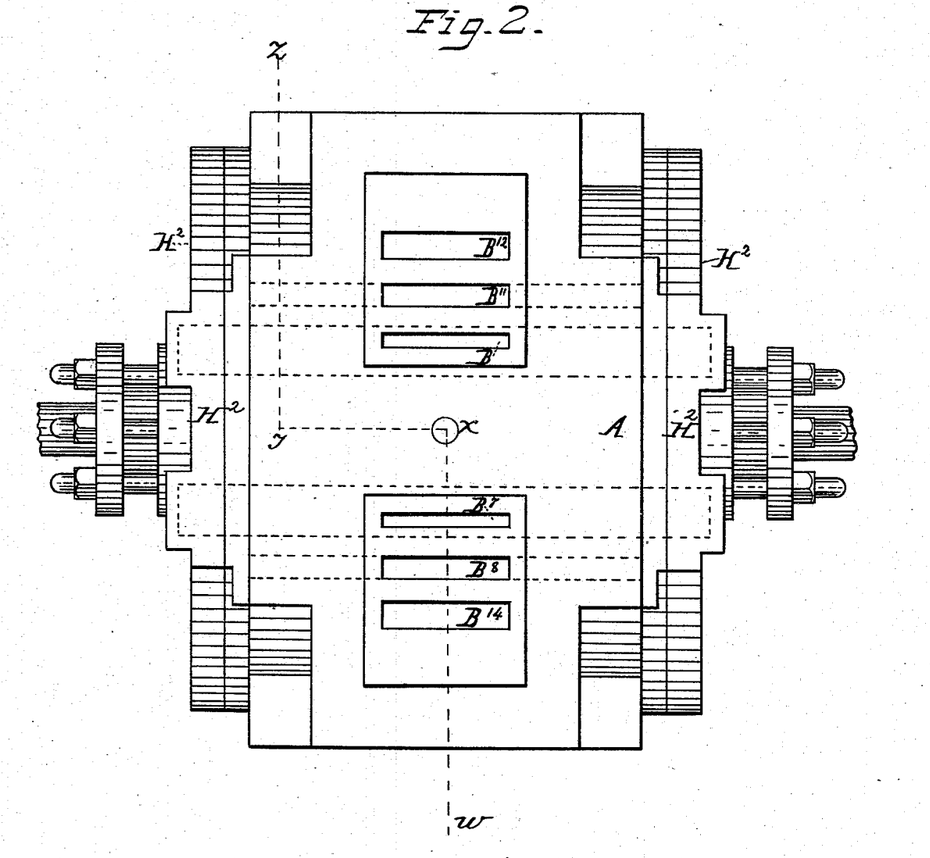
Fig. 2, a plan or top view, the steam-chest removed.
Figure 4:
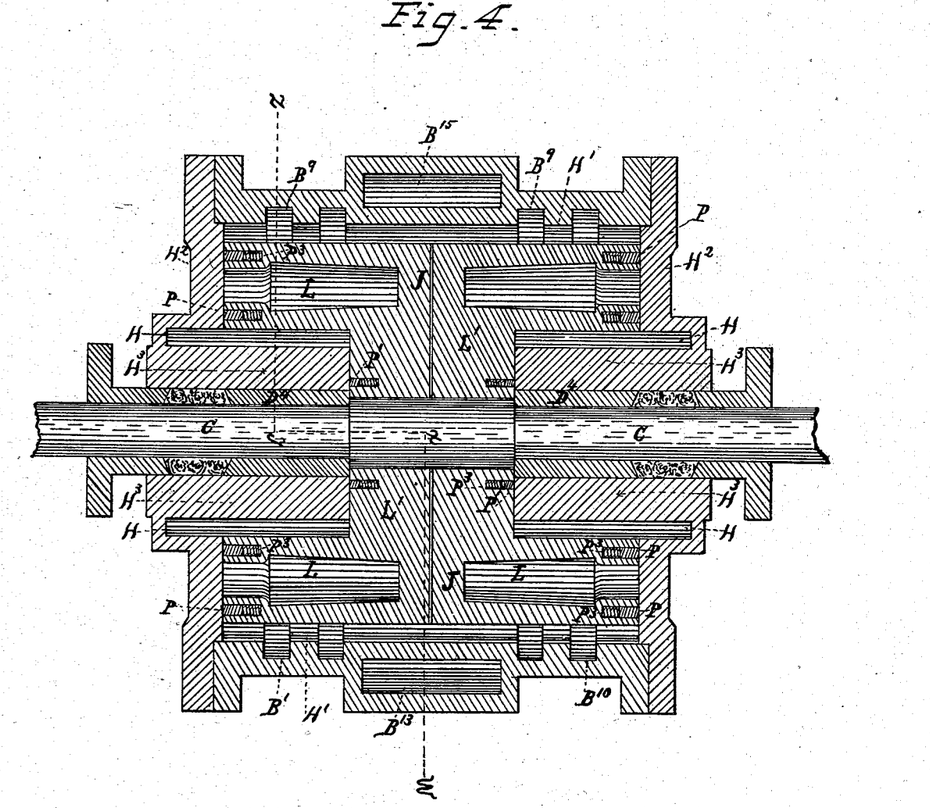
Fig. 4, a horizontal section through the center of the engine.
Figure 5:
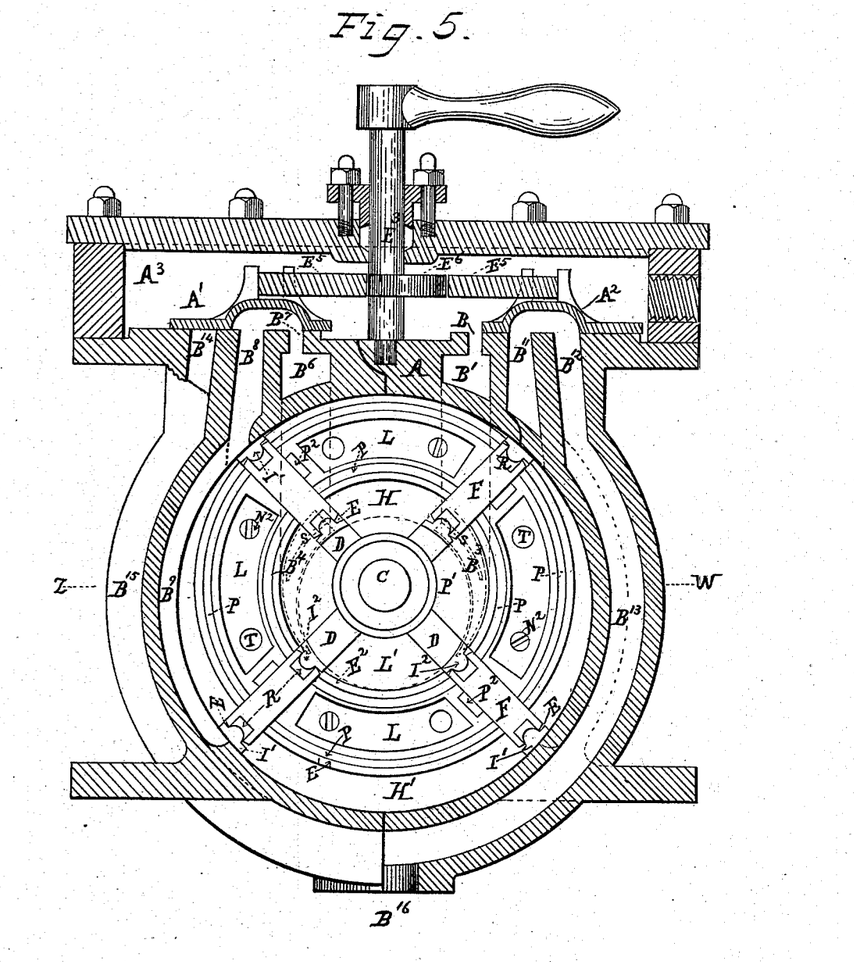
Fig. 5, a section through the line $w\ x\ y\ z$ of Figs. 2 and 4, with the piston shown in projection.
Figure 6:
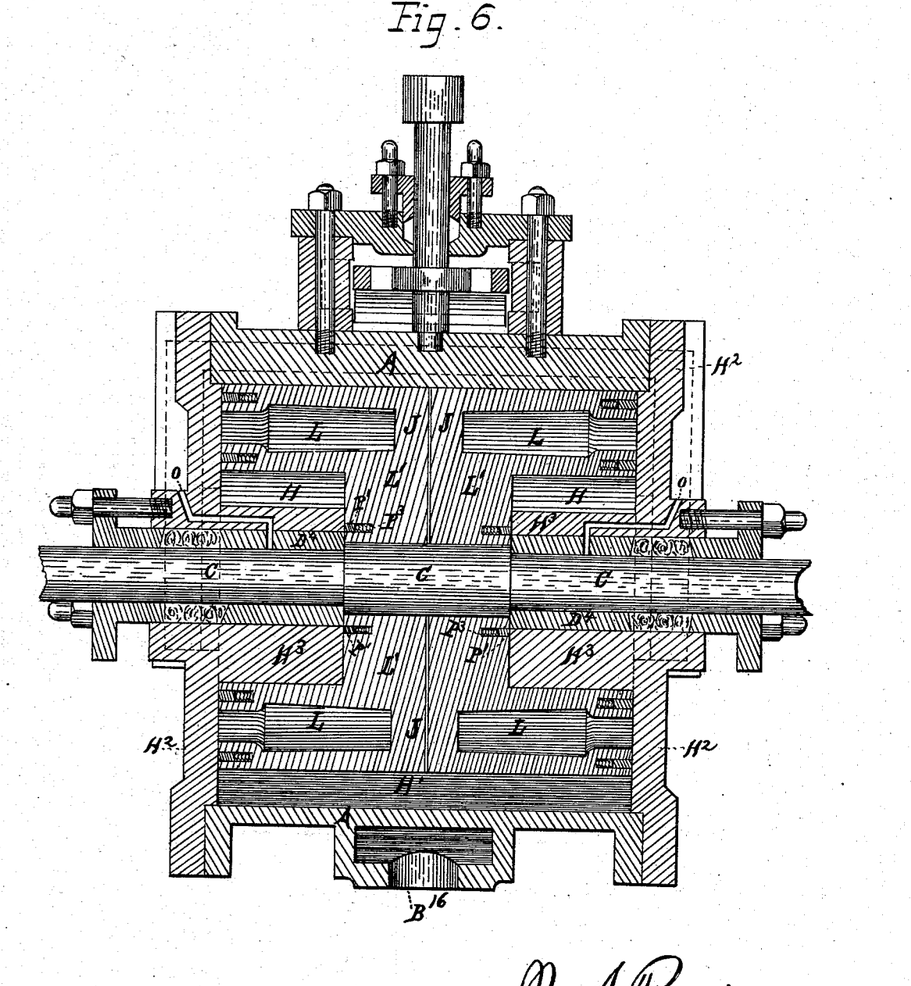
Fig. 6, a perpendicular longitudinal section through the center of the engine.
Figure 15:
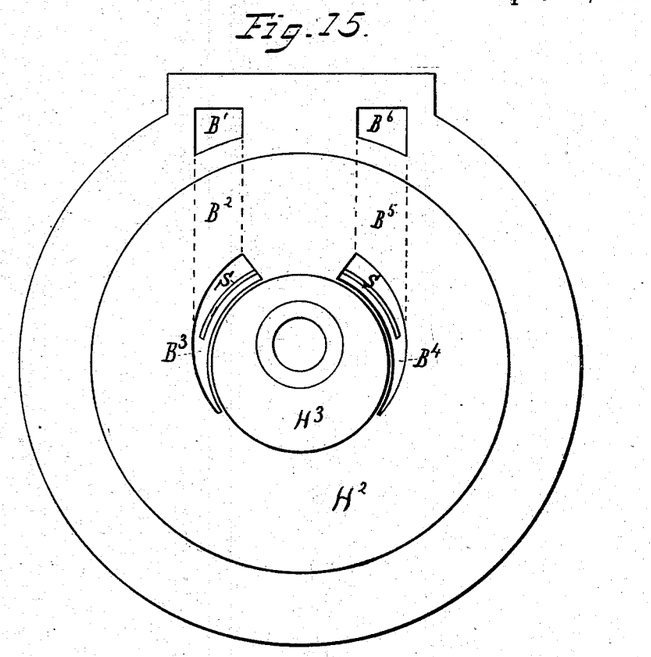
Fig. 15, plan view of inside of cylinder-head.
Figure 16:
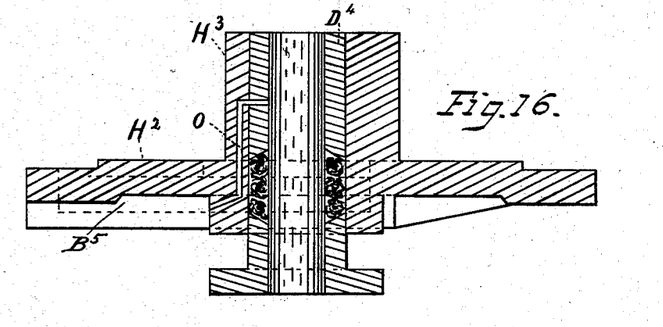
Fig. 16, section of same.

The piston of the engine revolves within the annular chamber of the case A, which chamber has the functions of and constitutes the outer cylinder, H', of the engine. This case is provided with a steam-chest, $A^3$, within which are the openings or ports B $B^{11} B^{12}$ and $B^7 B^8 B^{14}$ into the steam-passages leading into the cylinders, as shown in Figs. 2 and 5. The cylinder-heads $H^2$ carry arms $H^3$, which extend into the cylinders in a direction parallel with their axes. Tubular openings extend through the cylinder-heads and arms parallel to but eccentric with the axes of said cylinders, for the reception of the bushings $D^4$, within and through which bushings the shaft C revolves, the position of the piston within the cylinder H' being such that a crescent-shaped space is formed, which constitutes the steam-space of the outer cylinder of the engine. The steam-passages $B^2 B^5$ are cast in the cylinder-heads, as shown in Figs. 1, 15, 16, and are connected with the ports B $B^7$, situated in the steam-chest, through the horizontal steam-passages B' $B^6$ in the upper part of the case A, Figs. 1, 15, their lower openings or ports, $B^3 B^4$, opening into the inner or high-pressure cylinders H of the piston. These lower openings are provided with a guard or grating, S, Fig. 15, which guard or grating prevents the packing-pieces $I^2$ and R in their travel over said openings from being forced into or jammed in said openings, Fig. 5. The ports $B^{11} B^8$ open into and intersect the outer cylinder, H', at points which are equidistant from a perpendicular line drawn through the center of said cylinder, and are separated by a distance equal to the distance between the centers of the longitudinal slots or openings N of the piston at its periphery, Fig. 5. Series of parti-circumferential grooves $B^9 B^{10}$, Figs. 4 and 5, are formed in the surface of the outer cylinder, on each side thereof, the sum of the area of the cross-sections of each series being substantially equal to the area of the ports $B^{11} B^8$, respectively. These grooves begin at the intersection of the said ports with the outer cylinder, and extend downwardly therefrom on their respective sides of said cylinder to equal distances respectively, terminating at points which are separated by a distance equal to the distance (measured on the surface of the cylinder) between the centers of two contiguous piston-wings at their points of contact with the surface of said cylinder. The lower extremities of said piston-wings are situated in the lower part of the cylinder and equidistant from a perpendicular line drawn through its center, the office of said grooves being to provide steam-passages, whereby the steam in its downward passage may be allowed to pass along said grooves and past the extremity of the piston-wing which is traveling over the grooved section, and exert its force on the piston-wing which precedes it, and while said last-mentioned piston-wing is below the lower extremity of that series of grooves and is moving in that section of the cylinder in which it has its greatest relative projection from the piston, and permits the steam to pass said last-mentioned piston-wing along the grooved passages $B^{10}$ on the opposite side of the cylinder as soon as said piston-wing has passed the lower end of the said series of grooves $B^{10}$.

The exhaust-passages $B^{13} B^{15}$, Figs. 1, 4, and 5, are cast in the case A, their upper openings, $B^{12} B^{14}$, being into the steam-chest, Figs. 2 and 5, and their lower openings in the exhaust-port $B^{16}$, Figs. 1, 5, 6, 7, the steam being exhausted through the one or the other, in accordance with the direction in which the piston revolves.

Figure 3:
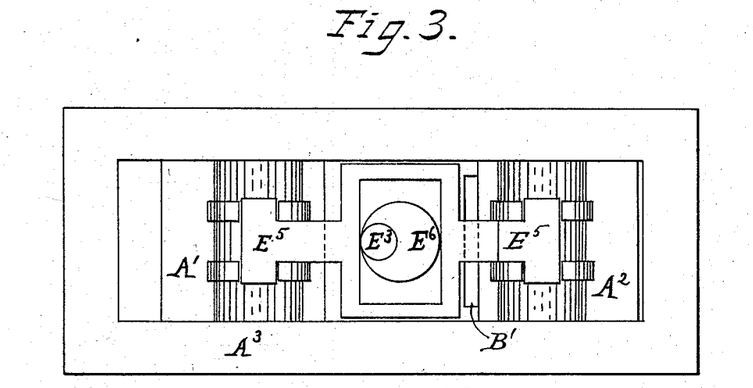
Fig. 3, a top view of the steam-chest, the cover removed, showing the valves, the yoke, and the cam or eccentric for operating said valves.

The valves A' $A^2$, Figs. 3, 5, are adapted to close and disclose the induction-ports B or $B^7$, respectively. When induction-port B is disclosed the valves form hoods over ports $B^7 B^8$ and $B^{11}$ and $B^{12}$ and seals $B^{14}$. When induction-port $B^7$ is disclosed the valves form hoods over B $B^{11}$ and $B^8 B^{14}$ and seals $B^{12}$, as shown in Fig. 5. Said valves are provided on their upper sides with bosses or projections adapted to receive the T-shaped heads of the yoke $E^5$, Figs. 3 and 5. This yoke, so engaging the valves, is operated by the cam $E^6$, which is actuated by the spindle $E^3$, revolved by a handle.

Figure 13:
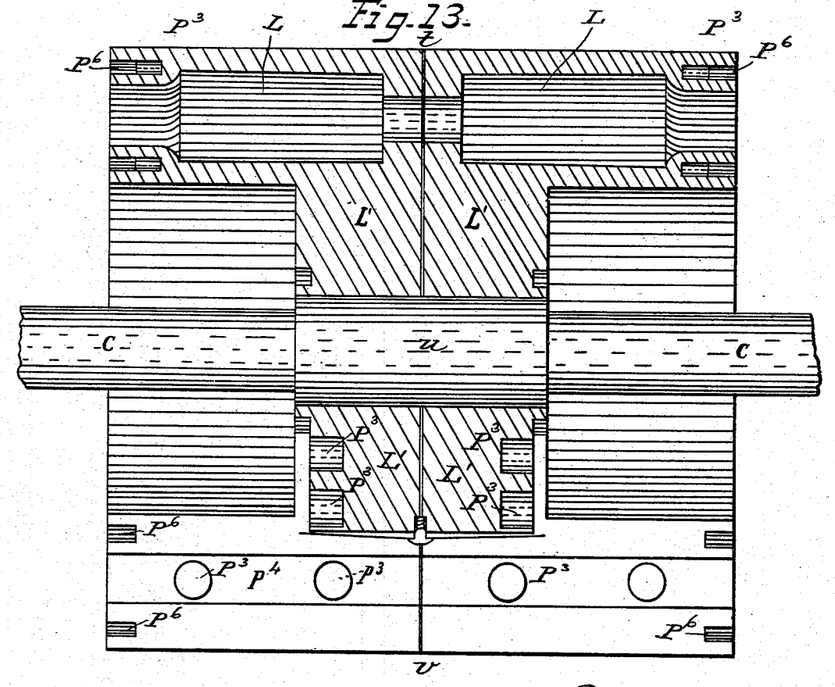
Fig. 13, a section through line $t\ u\ v$ of Fig. 8.
Figure 14:
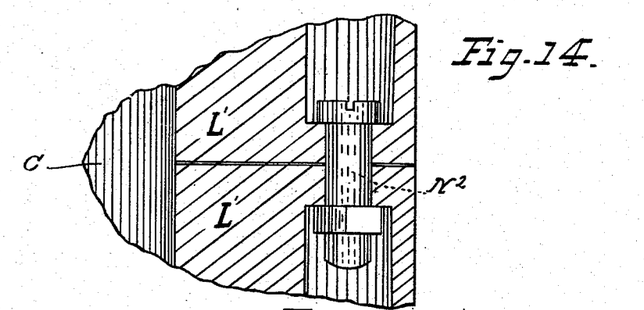
Fig. 14, section of piston made in two parts and bolted together.
Figure 17:
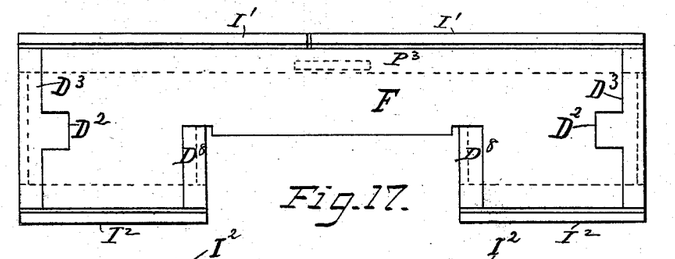
Fig. 17, a plan view of the piston-wing and packing-pieces.
Figure 18:
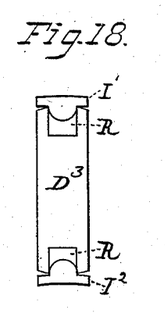
Fig. 18, an end view of the piston-wing, showing the packings.
Figure 19:
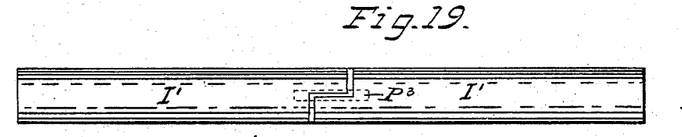
Fig. 19, face of outer packing-pieces.
Figure 20:
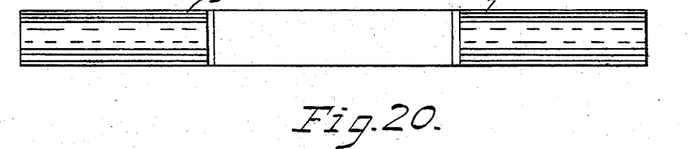
Fig. 20, face of inner packings.
Figures 21, 22, 23, 24:
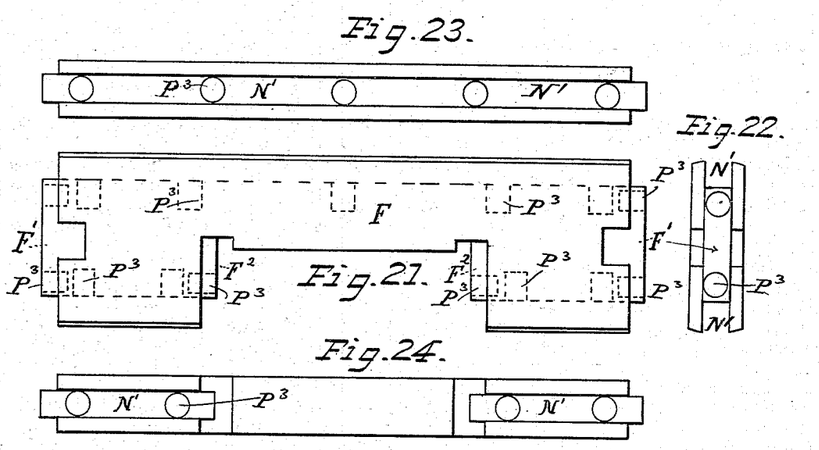
Fig. 21, piston-wing with all packings removed.
Figs. 22, 23, 24, views of end, outer edge, and inner edge of piston-wing.
Figures 25, 26:
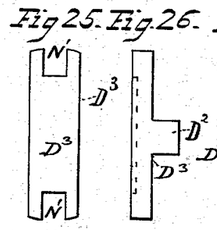
Figures 27, 29, 31:
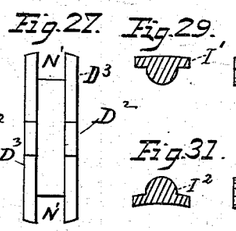
Figure 28:
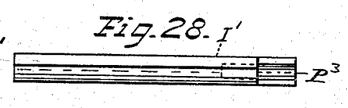
Figure 30:
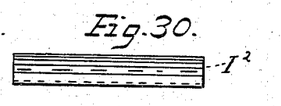
Figure 32:
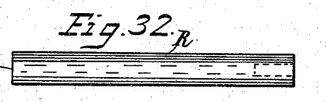
Figure 33:
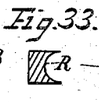
Figure 34:
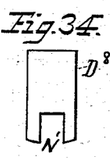
Figs. 34, 35, 36, face, side, and inside views of packing-pieces in contact with the packings in the hub of the piston.
Figure 35:
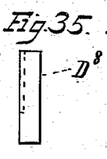
Figure 36:
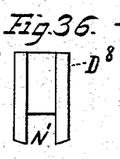

The piston which carries the piston-wing F is of skeleton form or construction, (the openings L being formed to lighten the piston,) and may be made either entire or divided transversely and secured together by bolts $N^2$, Figs. 13 and 14. This piston comprises the hub L', a centrally-dividing disk, J, forming part of said hub, provided with balance steam-openings T, connecting each pair of openings L, in order to secure an equilibrium of pressure on each side of said disk of such steam as may have passed the packings P. The inner rims, $E^2$, in connection with the arms $H^3$ of the cylinder-heads and the hub L' of the piston, form interior steam-spaces, H, that constitute the inner or high-pressure cylinders of the engine, and the crescent-shaped space H', between the piston and the cylindrical interior of the case A, constitutes the steam-space of the outer or low-pressure cylinder of the engine. The hub L' of the piston is provided at either end with packing-rings P' and packing-pieces D, which are pressed outwardly by springs in pockets $P^3$ laterally against and kept in contact with the extremities of the arms $H^3$ of the cylinder-heads, and the packing-pieces D also kept in contact with the packing-pieces $D^8$ on the inside portions of the projections of the piston-wings, Fig. 7. The lower ends of the packing-pieces D are also kept in contact with the periphery of the packing-ring P' by the pressure of bar-springs D', Fig. 7, which are secured to the hub L' at the bottom of the longitudinal radial openings or slots N, Figs 8 and 13. Thus the inner ends of the high-pressure cylinders are rendered steam-tight. The radial piston-wings F are arranged on opposite sides of the hub L' of the piston at equal distances apart, and occupy a longitudinally-radial position in the outer and inner cylinders, reciprocating radially in the piston through the longitudinal slots N, Figs. 8 and 5, their exterior and interior packings being continuously in contact with the surface of the annular chamber or outer cylinder, H', and the periphery of the arm H³, respectively, their reciprocation through the slots N of the piston being caused by their travel over the periphery of the eccentric arm H³ during the revolution of the piston about said arm. Each of these piston-wings is provided on its outer face or edge and on the inner faces or edges of its projections next to the arms H³ with grooves or channels N', Figs. 5, 22, 23, 24, adapted to receive the intermediate packing-pieces, R, Figs. 5 and 18. The packing-pieces in the grooves at the outer face or edge are jointed at or about the center, and each section possesses a pocket, the two coinciding pockets adapted to receive a spring capable of thrusting the two sections apart, and thereby press the outward ends against the heads of the cylinder. The packing-pieces R in the grooves at the face or edge of the projections of the piston-wings are each of one piece and of a length equal to the length of the arms H³. Springs situated in pockets P³ at the bottom of the grooves operate to thrust said packing-pieces outwardly. A concave groove is formed in the outer face of said packing-piece R, Figs. 32, 33, adapted to receive the convex tongues of the packings I' I², Figs. 5, 29, 31, whereby said packings may oscillate, and thus be self-adjusting, adapting themselves to the peripheries of the cylinder and the surface of the arms of the cylinder-heads, respectively, in whatever portion of the different cylinders the piston-wings may be, Fig. 5, the edges of the piston-wings being beveled to permit of the oscillations of the packings. A steam-packing space is thereby provided where the steam may operate to assist in keeping the packing in contact with the cylinder, Figs. 5, 18, 29. The face of the packing I' in contact with the outer cylinder is convex, Figs. 5, 18; I², which is in contact with the arms of the cylinder-heads, concave, Figs. 5, 18, 31. The packings I' are jointed and provided with spring-pockets and springs, as in the packing-pieces R, and the packings I² are in one piece, as shown in Fig. 20. In both cases the packings are kept in contact with the cylinder and the arms H³, respectively, by springs in pockets P³ in the bottom of the grooves N' acting on the packing-pieces R, before referred to. Tongues F', Fig. 21, are formed at the extremities of the piston-wings, and tongues F² on the inside of the projections of the piston-wings, adapted to engage the grooves or channels of the packing-pieces D³, Figs. 25, 26, 27, and D⁸, Figs. 7, 17, respectively. The pieces D³ are provided with rectangular notches at each extremity, coinciding with the grooves N' of the piston-wings, and receive the packing-pieces R, which carry the packings I' and I², respectively.

Springs situated in pockets P³ in said tongues press the packing-pieces D³ outwardly and keep them in contact with the cylinder-heads. The packing-ears D² form a part of the packing-pieces D³, and, extending at right angles therefrom, bear against the sides of the tongues F', and are received into grooves formed in the sides of the piston-wing, their office being twofold—to prevent steam passing over the tongues F' through any interstice between the piston-wing and the packing-pieces D³, and also to prevent any independent radial movement along the end of the piston-wing.

At the inside of the projections of the piston-wing the packing-pieces D⁸, before referred to, are employed as a packing between said piston-wing and the packing-pieces D in the hub of the piston. Rectangular notches are formed in their lower extremities, coinciding with the grooves N' in the piston-wing, and receive the packing-pieces R, which carry packings I². Springs in pockets P³ of the tongues F² press D⁸ toward and keep them in contact with the packing-pieces D.

Figures 8, 9, 10, 11, 12:
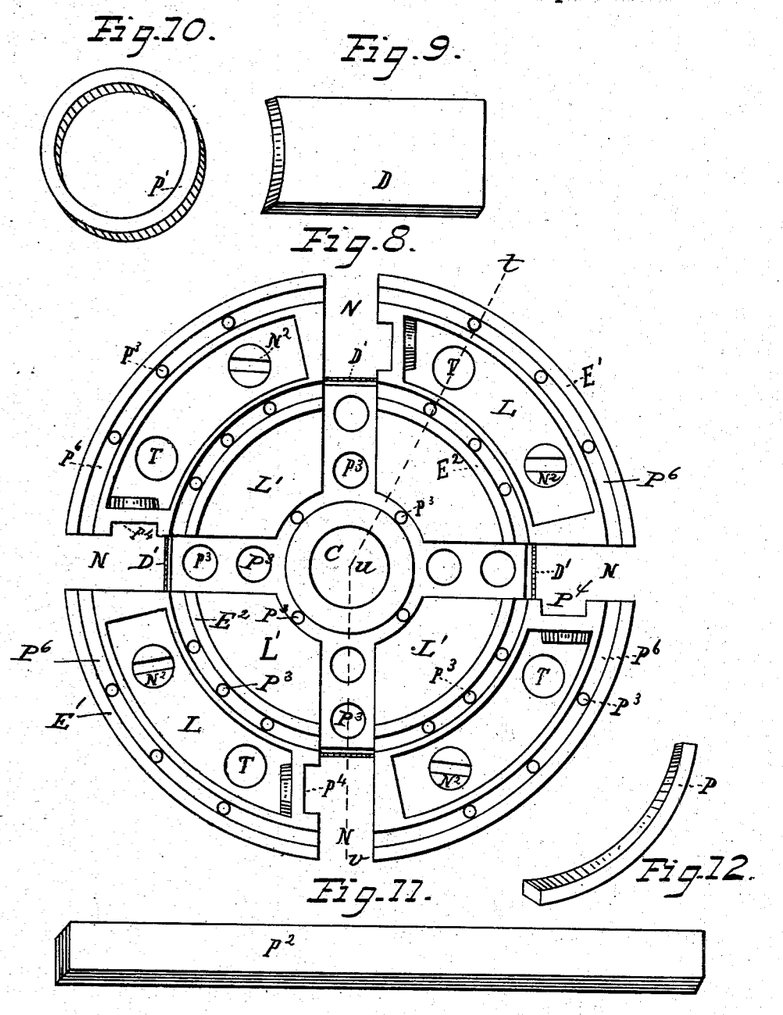
Fig. 8, an end view of the piston, the piston-wings removed.
Fig. 9, a packing-piece in the hub of the piston, pressing outwardly against the arm of the cylinder-head, the projection of a piston-wing, and downwardly against the packing-ring of the hub.
Fig. 10, the packing-rings in the hub of the piston pressing against the ends of the arms of the cylinder-heads.
Fig. 11, one of the packing-pieces operating in the slots or longitudinal openings of the piston against the sides of the piston-wings.
Fig. 12, one of the segmental packing-pieces in the end of the piston operating against the head of the cylinder.

A longitudinal groove, P⁴, is formed in one of the sides or faces of each of the slots N of the piston, Figs. 8, 13. A packing, P², Fig. 11, operates in said groove, and is kept in contact with said piston-wing by springs in pockets P³, whereby the passage of steam through the slots or openings N from the inner to the outer cylinder may be prevented, Figs. 5, 8, 11, 13. Segmental curvilinear grooves P⁶ are formed in the ends of the rims E' E² of the piston, Figs. 8, 13, which receive the packing-pieces P, Figs. 5, 12. Springs in pockets P³ in said grooves press these packing-pieces against and keep them in contact with the cylinder-heads.

The operation is as follows: The steam having been admitted into the steam-chest A³, the valves A' A² being so situated that the opening into the port B is disclosed and the opening into the port B⁷ closed, the steam passes down into and through the horizontal passage B' to and through the passages B² in the heads of the cylinder, thence through their ports B³ into the high-pressure cylinders H in the piston, Figs. 5, 15. Its pressure is there exerted on the projections of a piston-wing while in the larger section thereof. Said piston is thereby rotated until said piston-wing has passed or opened the ports B⁴ in the cylinder-heads into the space between it and the piston-wing immediately following, (the outer extremity of the piston-wing preceding the first-mentioned piston-wing being then at the lower extremity of the series of grooves down which the steam is passing,) when the steam within said space is exhausted out through said ports B⁴, up passages B⁵, through horizontal passage B⁶, out B⁷, under the hood of valve A', thence down through the grooved section of the outer cylinder, where the steam acts expansively on that portion of the piston-wing before mentioned projecting outwardly from the piston after said piston-wing has reached the lower extremity of the series B⁹ of parti-circumferential grooves and until said piston-wing passes the lower extremity of the series of grooves B¹⁰ on the opposite side of the cylinder, when the steam passes upwardly through said grooves B¹⁰, past the piston-wing, along port B¹¹, thence under the hood of the valve A², down through port B¹² and passage B¹³, through exhaust-port B¹⁶, into the condenser or the atmosphere, the effect being that the high-pressure steam is conveyed into and actuates the projections of the piston-wing within the inner cylinders, and is then exhausted into the outer cylinder, where it exerts its force expansively on the wings of the piston while said piston-wings are traveling in the largest sections of the crescent-shaped cylinders.

It is evident that a reversal of the position of the valves—i. e., a change of the induction-ports—would operate to reverse the direction in which the engine would travel, would close induction-port B to the steam-chest, seal B¹², and thus render exhaust-passage B¹³ inoperative, the flow of steam through the various steam-passages would be reversed and the exhaust-passage B¹⁴ brought into use; but the conditions under which the engine operates would remain the same—that is to say, at high pressure in the inner cylinders and expansively at a lower pressure in the outer cylinder.

Figure 7:
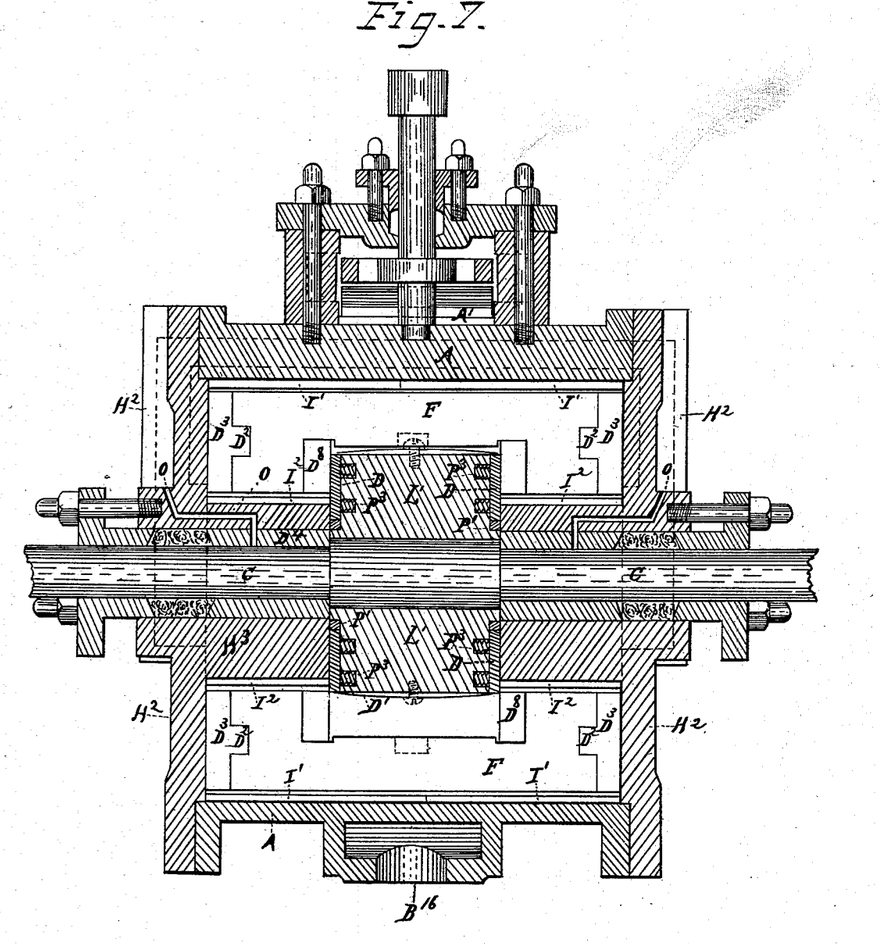
Fig. 7, a perpendicular longitudinal section through the center of the engine, showing two of the piston-wings in projection.

Oilways O are provided in the cylinder-heads to convey oil to the shaft, as shown in Figs. 4, 7, 16.

Having thus described my invention, what I claim, and desire to secure by Letters Patent, is—

1. The cylinder-case A, the hooded valves A' A², the respective receiving and discharging steam-ports and steam-passages through which the steam moves from its introduction into until its emission from the engine, the arms H³ of the cylinder-heads, and the wing-bearing piston containing the high-pressure cylinder H, all combined, whereby the wings of the piston are each in its turn presented to the action of and rotated by the steam at high pressure in the inner cylinders formed in the piston and expansively at a lower pressure in the outer cylinder, while those portions of said wing which are subjected to such pressures are respectively projected into the larger sections of the respective cylinders, substantially as and for the purpose set forth.

2. The cylinder-case A, provided with duplicate series of steam-ports and steam-passages, the steam-chest A³, provided with duplicate series of steam-openings, the cylinder-heads H², provided with duplicate steam-ports and steam-passages, the cylinder H', provided with a duplicate series of parti-circumferential grooves situated on either side thereof, the duplicate adjustable hooded valves A' A², the arms H³, the wing-bearing piston, and the cylinder H, all combined, whereby the steam may be admitted at will to operate at or be exhausted from either side of the cylinders, and the piston thereby rotated in either direction, and wherein in either case the steam is first employed in the inner cylinders at a high pressure and afterward exhausted therefrom into the outer cylinder, where it is employed expansively at a lower pressure, substantially as set forth.

3. In a rotary engine, a steam-cylinder having a duplicate series of parti-circumferential grooves formed in its inner periphery and situated on either side thereof, extending downwardly from the ports opening into said cylinder, and the exhaust-ports and exhaust-passages in the case of the cylinder, in combination with a revolving piston carrying radially-reciprocating wings, substantially as and for the purpose set forth.

4. The duplicate eduction-ports B¹² B¹⁴, the adjustable hooded valves A' A², the duplicate exhaust-passages B¹³ B¹⁵, the exhaust-port B¹⁶, and the intermediate steam-ports and steam-passages, in combination with the cylinders of the engine, wherein said exhaust-passages are respectively brought into use in response to the operation of the valves A' A², respectively, substantially as and for the purpose set forth.

5. The piston-hub L', packing-rings P', packing-pieces D, and bar-springs D', all combined, substantially as and for the purpose specified.

6. The piston-wings F, intermediate packing-pieces, R, and the oscillating packings I' I², all combined, substantially as and for the purpose set forth.

7. The oscillating packings I' I², operating in the intermediate packing-pieces, R, in combination with the beveled edges of the piston-wings, whereby a steam packing space, E, is formed, substantially as and for the purpose specified.

8. The piston-wings F, tongues F' F², intermediate packing-pieces, R, and packings D³ D⁸, substantially as and for the purpose specified.

9. The piston-wings F, tongues F', packing-pieces D³, and packing-ears D², all combined substantially as set forth.

10. The valves A' A², yoke E⁵, cam E⁶, and spindle E³, all combined substantially as and for the purpose set forth.

WILLIAM J. FRAZIER.

Witnesses:
JOHN D. MOORE,
HENRY M. MOSHER.